(12) United States Patent
Quioc et al.

(10) Patent No.: US 7,506,891 B2
(45) Date of Patent: Mar. 24, 2009

(54) BELT AND SIDE IMPACT INFLATOR

(75) Inventors: Eduardo L. Quioc, Westland, MI (US); David S. Whang, Bloomfield Hills, MI (US); Paresh S. Khandhadia, Troy, MI (US)

(73) Assignee: Automotive Systems Laboratory Inc., Farmington Hills, MI (US)

( * ) Notice: Subject to any disclaimer, the term of this patent is extended or adjusted under 35 U.S.C. 154(b) by 516 days.

(21) Appl. No.: 10/826,437

(22) Filed: Apr. 16, 2004

(65) Prior Publication Data

US 2004/0256847 A1 Dec. 23, 2004

Related U.S. Application Data

(60) Provisional application No. 60/463,595, filed on Apr. 17, 2003.

(51) Int. Cl.
*B60R 21/26* (2006.01)
(52) U.S. Cl. .................. 280/741; 280/733; 280/280; 280/736
(58) Field of Classification Search .............. 280/733, 280/736, 737, 741, 742; 102/704
See application file for complete search history.

(56) References Cited

U.S. PATENT DOCUMENTS

| | | | |
|---|---|---|---|
| 2,995,088 A | | 8/1961 | Asplund |
| 3,972,545 A | * | 8/1976 | Kirchoff et al. ............. 280/735 |
| 4,380,346 A | * | 4/1983 | Davis et al. .................. 280/736 |
| 4,394,033 A | * | 7/1983 | Goetz et al. .................. 280/736 |
| 4,437,681 A | * | 3/1984 | Adams et al. ............... 280/733 |
| 5,753,852 A | * | 5/1998 | Bernau et al. ............... 102/530 |
| 5,951,042 A | * | 9/1999 | O'Loughlin et al. ........ 280/741 |

(Continued)

FOREIGN PATENT DOCUMENTS

DE 4009551 A1 * 9/1991

(Continued)

OTHER PUBLICATIONS

The American Heritage Dictionary, 2nd College Edition, c. 1982, p. 504.*

(Continued)

*Primary Examiner*—Eric Culbreth
(74) *Attorney, Agent, or Firm*—L.C. Begin & Associates, PLLC.

(57) ABSTRACT

The present invention provides an airbelt inflator (10) designed primarily for supplying and directing gas from the combustion of gas generant materials into a vehicle airbelt. Inflator (10) includes a substantially cylindrical inflator body (12), having a first end (11) and a second end (13). A unique booster cup (22) is positioned within inflator body (12), and is preferably press fit with initiator body (15), suspending cup (22) within inflator body (12). Cup (22) facilitates consistent burn of the main propellant, imparting repeatable bag performance. A cylindrical mesh filter (38) is positioned in inflator body (12). A nozzle (36) is preferably positioned adjacent a disc (30). A variety of different nozzles giving inflator (10) varying gas output characteristics can be utilized with inflator (10), for example thrusting inflators or thrust-neutral inflators, depending on the operating requirements of the airbelt system. Booster cup (22) is sized such that it extends into inflator body (12), and abuts filter (38), thereby serving as a stand off or locator for filter (38), and providing a relatively snug packing arrangement for propellant tablets (28).

33 Claims, 4 Drawing Sheets

U.S. PATENT DOCUMENTS

| | | | |
|---|---|---|---|
| 6,012,737 A * | 1/2000 | Van Wynsberghe et al. | 280/737 |
| 6,065,774 A * | 5/2000 | Cabrera | 280/741 |
| 6,095,559 A * | 8/2000 | Smith et al. | 280/741 |
| 6,142,512 A * | 11/2000 | Suyama | 280/733 |
| 6,145,873 A * | 11/2000 | Takeuchi | 280/733 |
| 6,196,583 B1 * | 3/2001 | Ruckdeschel et al. | 280/736 |
| 6,199,905 B1 * | 3/2001 | Lewis | 280/737 |
| 6,237,498 B1 * | 5/2001 | Winterhalder et al. | 102/530 |
| 6,237,950 B1 * | 5/2001 | Cook et al. | 280/736 |
| 6,279,945 B1 * | 8/2001 | Schneider et al. | 280/733 |
| 6,419,263 B1 * | 7/2002 | Busgen et al. | 280/733 |
| 6,491,321 B1 * | 12/2002 | Nakashima et al. | 280/736 |
| 6,523,856 B2 * | 2/2003 | Braun et al. | 280/733 |
| 6,863,303 B2 * | 3/2005 | Yamazaki et al. | 280/736 |
| 6,871,873 B2 * | 3/2005 | Quioc et al. | 280/741 |
| 6,935,655 B2 * | 8/2005 | Longhurst et al. | 280/736 |
| 2004/0053182 A1 * | 3/2004 | Yoshida et al. | 431/352 |

OTHER PUBLICATIONS

The Random House College Dictionary, c. 1980, p. 494.*

* cited by examiner

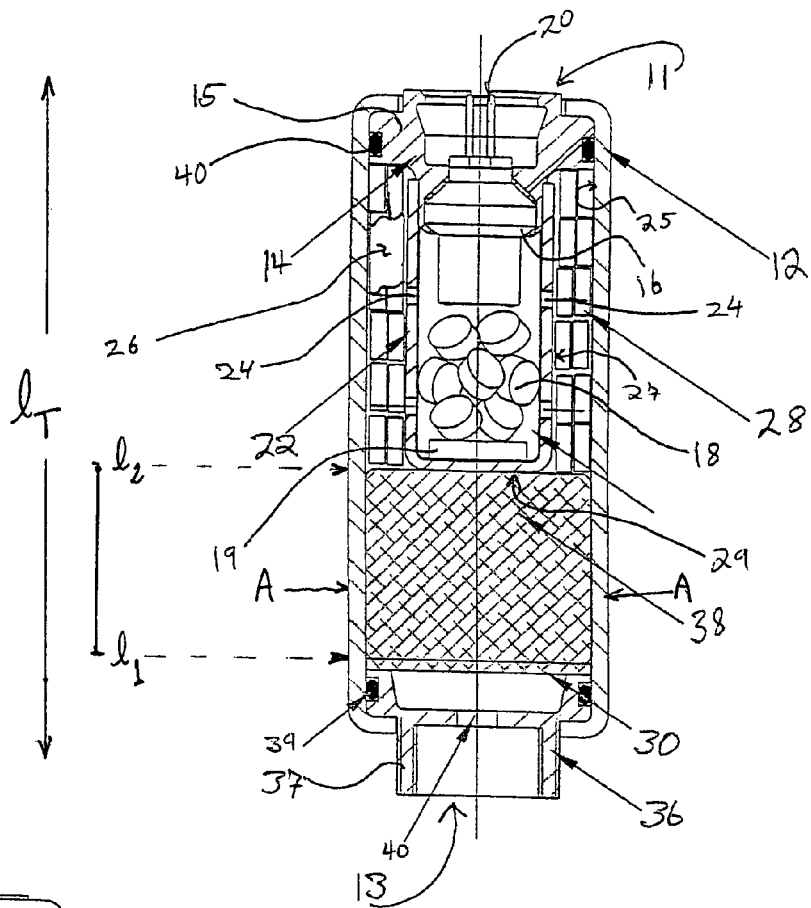
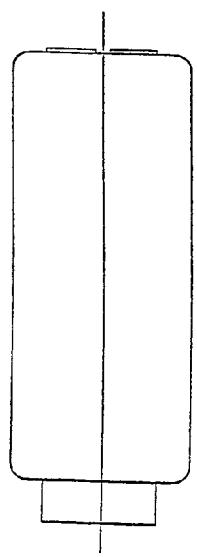
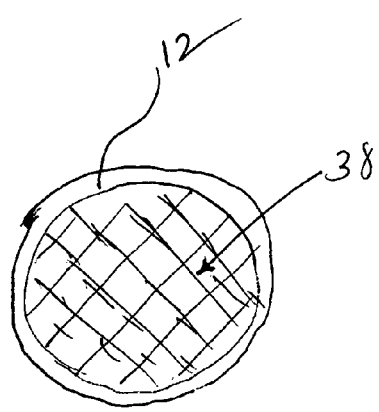

BELT AND SIDE IMPACT INFLATOR

This application claims benefit and priority of U.S. provisional application No. 60/463,595, filed Apr. 17, 2003.

TECHNICAL FIELD

The present invention relates generally to gas generator devices for inflatable restraint systems in automobiles, and relates more particularly to a belt and side impact inflator having a unique booster cup design and method of assembly.

BACKGROUND OF THE INVENTION

Inflatable restraint systems or "airbag" systems have become a standard feature in most new vehicles. These systems have made significant contributions to automobile safety; however, as with the addition of any standard feature, they increase the cost, manufacturing complexity and weight of most vehicles. Technological advances addressing these concerns are therefore welcomed by the industry. In particular, the gas generator or inflator used in many occupant restraint systems tends to be the heaviest, most complex component. Thus, simplifying the design and manufacturing of airbag inflators, while retaining optimal function, has long been a goal of automotive engineers.

Typical inflators are constructed having an elongate metallic body. Because many inflators utilize pyrotechnic gas generant compounds to produce inflation gas for the associated airbag, the inflator structure is necessarily robust, making such inflators correspondingly heavy. The long term success of driver-side and passenger side inflatable restraint systems has prompted automotive manufacturers to increasingly investigate and implement side impact inflatable restraints, as well as inflatable airbelts. Because the inflatable systems are typically mounted in the vehicle roof pillars, doors or seats, mounting space can be at a premium. Moreover, coupled with inherent difficulties in engineering inflators capable of producing the relatively small, punctuated inflation charges typical of side impact airbags and airbelts, such systems present a unique set of challenges to designers. Engineers have developed numerous designs for optimizing weight, operation and assembly; however, the pressure to downsize components and reduce manufacturing challenges continues to be acute.

Accompanying the need for ever simpler and more elegant designs is the desirability of inflators that are relatively robust yet capable of reliable operation even after storage periods of several years. One problem in particular associated with long periods between installation in a vehicle and activation of the inflator relates to mechanical degradation of the gas generant or propellant material. Many gas generants are provided in a solid, typically tablet form. Jostling of the propellant within the inflator can have the undesirable effect of breaking or crumbling the propellant tablets, reducing their efficacy in some cases. Various spring-biased mechanisms for constraining movement of the propellant tablets have been proposed; however, these systems tend to increase manufacturing complexity and cost, and add extra components to the inflator, adding to the weight of the system.

SUMMARY OF THE INVENTION

In one aspect, the present invention provides an inflator for an inflatable restraint system in a vehicle. The inflator preferably includes an elongate substantially cylindrical inflator body having first and second ends and an inner peripheral wall. A booster cup is positioned within the inflator body and preferably extends substantially coaxially with the body, defining a combustion chamber therebetween.

In another aspect, the present invention provides an airbag module, preferably having an inflator with an elongate substantially cylindrical inflator body having first and second ends and an inner peripheral wall. A booster cup is positioned within the inflator body and preferably extends substantially coaxially with the body, defining a combustion chamber between the body and the cup.

In still another aspect, the present invention provides a vehicle occupant protection system, preferably having an inflator with an elongate substantially cylindrical inflator body with first and second ends and an inner peripheral wall. A booster cup is positioned within the inflator body and preferably extends substantially coaxially with the body, defining a combustion chamber between the body and the cup. The inflator is operable to provide an inflation gas to an inflatable restraint device such as an airbag or airbelt.

BRIEF DESCRIPTION OF THE DRAWINGS

FIG. 1 is an elevational view of an airbelt inflator according to a preferred embodiment of the present invention;

FIG. 2 is a sectioned side view of an airbelt inflator similar to the inflator of FIG. 1;

FIG. 6 is a sectional view taken along the line A-A of FIG. 2.

DETAILED DESCRIPTION OF PREFERRED EMBODIMENTS

Figure 3:
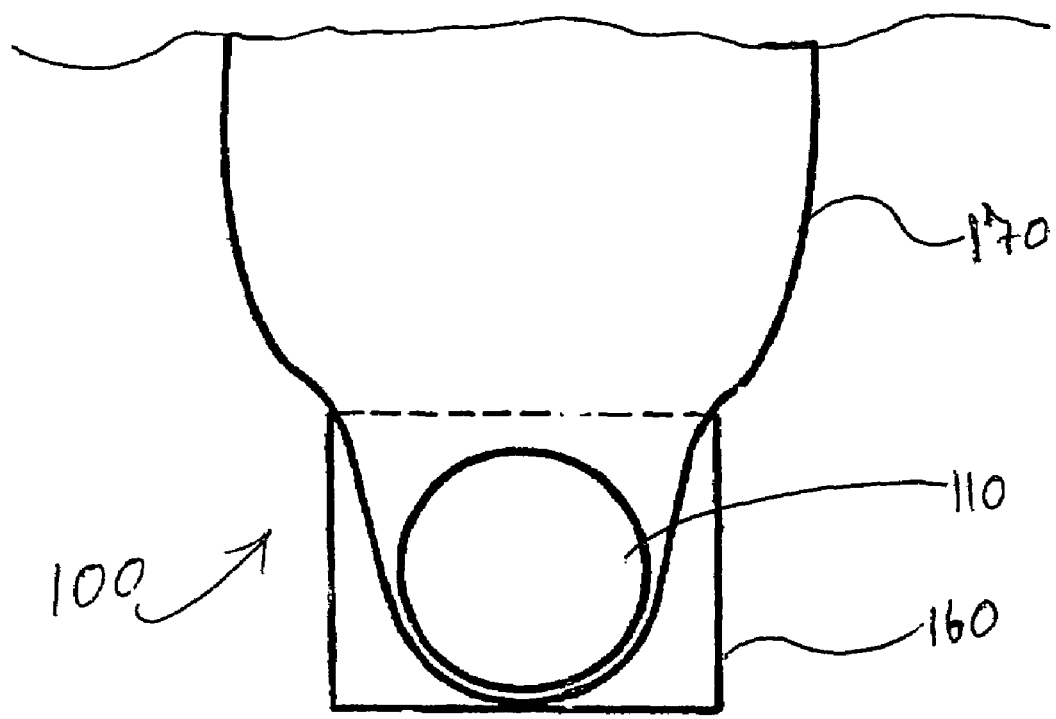
FIG. 3 is a partial schematic view of an airbag module and airbag.

Referring to FIG. 1, there is shown an elevational view of an airbelt inflator 10 according to a preferred constructed embodiment of the present invention. Inflator 10 is preferably a single stage device designed primarily for supplying and directing gas from the combustion of pyrotechnic gas generant materials into an inflatable vehicle safety airbelt, but is not limited to such an application. Exemplary, but not limiting airbelts and/or vehicle occupant protection systems are described in U.S. Pat. Nos. 6,116,137, 6,170,863, 6,145,873, 6,142,512, and 6,523,856, herein incorporated by reference. Inflator 10 may be manufactured entirely from known materials and by known processes.

Turning to FIG. 2, there is shown a sectioned side view of an inflator 10, similar to the inflator of FIG. 1. Inflator 10 includes a substantially cylindrical inflator body 12, having a first end 11 and a second end 13. An initiator assembly 14 is positioned within first end 11, and is preferably secured therein by crimping inflator body 12 in a conventional manner. Initiator assembly 14 includes an initiator body 15 with an attached igniter or squib 16. It should be appreciated that some other attachment method such as mating threads or a snap-fit or press-fit connection could be used rather than a crimp to hold initiator assembly 14 in place. An O-ring 40, preferably a conventional elastomeric O-ring, preferably encircles initiator body 15, and fluidly seals first end 11 of inflator body 12. The igniter 16 has a set of electrical contacts 20, preferably accessible from first end 11. Igniter 16 may be any suitable known igniter, for instance, the igniter taught in U.S. Pat. No. 5,934,705, herein incorporated by reference, and is preferably connected to an automobile electrical system whereby it can be activated in a conventional manner.

A unique booster cup 22 is positioned within inflator body 12, and is preferably press fit with initiator body 15, suspending cup 22 within inflator body 12. Booster cup 22 includes an end surface 29 that extends radially inwardly, or substantially orthogonally to a longitudinal axis of the body 12, and is preferably substantially planar. A booster charge 18 is preferably positioned in booster cup 22, and is ignitable with igniter 16, activating inflator 10 in a conventional manner. In addition, an autoignition tablet 19 may be placed in booster cup 22 (or elsewhere in inflator 10), and can be ignited at an elevated temperature, in a manner well known in the art. A plurality of apertures 24 are preferably positioned around booster cup 22, and preferably spaced along the length thereof. Apertures 24 can fluidly connect the interior of cup 22, a first combustion chamber, with a second or main combustion chamber 26, within which the main gas generant charge 28 is positioned. Main chamber 26 is bounded at an outside by an inner peripheral wall 25 of inflator body 12, and on an inside by an outer peripheral wall 27 of cup 22. The main gas generant charge 28 may be any suitable propellant known in the art, and preferably consists of a non-azide propellant in tablet form. Exemplary, but not limiting compositions are described in U.S. Pat. Nos. 5,035,757, 5,872,329, 5,756,929, and 5,386,775, herein incorporated by reference.

Various foils or similar materials may be placed over apertures 24 to seal the interior of cup 22 from main chamber 26, facilitating more robust burning of booster charge 18 in some instances, by allowing cup 22 to accommodate a resident interim gas pressure, in a manner known in the art. Sealing the contents of cup 22 from the outside environment also helps protect against degradation of the propellant. In a particularly preferred embodiment cup 22 extends approximately one half of a length of inflator body 12. Main propellant charge 28 preferably substantially fills chamber 26 and the tablets 28 are positioned in a geometrically ordered fashion inside chamber 26 such that they fill the space substantially uniformly. One preferred embodiment includes a plurality of substantially cylindrical tablets having their cylindrical axes (not shown) oriented substantially perpendicular to walls 25 and 27.

A cylindrical filter 38, preferably a metallic mesh filter, is positioned in inflator body 12, and filters particulate materials generated by the combustion of propellant charges 18 and 28. Filter 38 fills a volume of the housing 12 defined by the cross-section of filter 38 (shown in FIG. 6) spanning from a point $1_1$ to a second point $1_2$. The longitudinal distance defined by the distance between $1_1$ and $1_2$ ranges from about one-fourth to one half of the total length of housing 12, or $1_T$. Adjustment of the length of the filter 38 therefore increases or reduces the pressure of the gas at the second end 13 and as such, may function as a filter, a gas pressure throttle, and/or a heat sink depending on design criteria. Suitable, exemplary filters are available from Wayne Wire of Kalkaska, Mich. Filter 38 also serves as a heat sink for hot combustion gases produced during inflator activation, cooling the gases before their ejection into the associated airbelt or airbag. In a preferred embodiment, a perforated disc 30, preferably an expanded metal, is positioned adjacent filter 38, and facilitates the creation of a resident interim gas pressure in inflator body 12 during combustion of the propellant. A nozzle 36 is preferably positioned adjacent disc 30 and secured with inflator body 12 by crimping second end 13, although the nozzle 36 might be threadedly attached to inflator body 12 if desired. An O-ring 39 is preferably circumferential about a portion of nozzle 36, and thereby creates a fluid-tight seal at second end 13. In a preferred embodiment, nozzle 36 includes a substantially cylindrical projection 37 that extends past second end 13. An internally projecting ledge is preferably positioned within nozzle 36, and preferably includes a central aperture 40, that may be covered by a conventional burst shim (not shown).

In a preferred embodiment, inflator 10 is assembled by serially positioning the interior components in an innermost to outermost fashion, i.e. inserting those components adjacent first end 11 first, then placing the various additional components into the inflator body in order, and lastly sealing second end 13. A variety of different nozzles giving inflator 10 varying gas output characteristics can be utilized with inflator 10. For example, where it is desirable to provide a "thrusting" inflator, the nozzle 36 as pictured in FIG. 2 might be utilized. Such a design results in a relatively narrow or smaller "plug" of a directed pulse of gas from inflator 10 during activation. Moreover, by restricting the diameter through which the gas is ejected from the inflator, a relatively greater thrust is imparted to the exiting gas per unit time. In contrast, where a thrust-neutral inflator is desirable, or where greater relative outward spreading of the gas discharging from inflator 10 is desired, a different nozzle can be used. For instance, a nozzle might be used having a greater number of apertures for discharging gas, or apertures that are spaced or otherwise designed to allow a more gradual exit of the gas, or more outward directing of the gas. Similarly, the extension 37 might be flared outwardly to assist in outwardly directing the discharging gas. Inflator 10 can be easily converted from a thrusting to a non-thrusting inflator by changing the nozzle used therewith.

Other advantages of the presently disclosed design result from the unique booster cup design. In a preferred embodiment, booster cup 22 is sized such that it extends into inflator body 12, and abuts filter 38, thereby serving as a locator for filter 38, and providing a relatively snug packing arrangement for propellant tablets 28. Thus, cup 22, inflator body 12, filter 38 and initiator body 15 define chamber 26, and securely retain tablets 28 therein, preventing their being crushed by the igniter, filter, and other components during assembly and thereafter during storage of inflator 10. In addition, the booster cup design results in relatively consistent, repeatable bag performance. The relatively small, lightweight design makes manufacturing of the inflator easier and less expensive. Moreover, lighter weight is often desirable in vehicle inflatable restraint systems.

In the event of an impact, sudden vehicle deceleration, or other appropriate condition, an electrical signal is sent to igniter 16 from an onboard electronic controller (not shown) in a conventional manner. Igniter 16 subsequently ignites the gas generant booster tablets 18 located in cup 22. Ignition of booster tablets 18 creates a flame front that traverses apertures 24, resulting in a relatively rapid ignition of the main charge tablets 28 in cavity 26. Ignition of main charge 22 results in the very rapid creation of combustion gases in inflator body 12, and a consequent very rapid rise in the internal gas pressure in inflator body 12. When the internal gas pressure has risen to a sufficient level, it ruptures the burst shim, foil, etc. placed across aperture 40 (not shown). Thenceforth, the gas flows out nozzle 36 into the associated airbelt or airbag. In a preferred embodiment, inflator 10 is positioned in a vehicle B-pillar, and is operable to direct inflation gas into an inflatable safety restraint belt when activated by a vehicle sensing system. However, inflator 10 might also be positioned in a vehicle C-pillar, or even elsewhere in the vehicle. Furthermore, inflator 10, although especially useful in vehicle airbelts, may also be applicable in other vehicle occupant protection airbag systems. Finally, it is also believed that the present gas generator may be useful in other applications to include inflatable lifeboats and inflatable aircraft exit ramps, for example.

Figure 5:
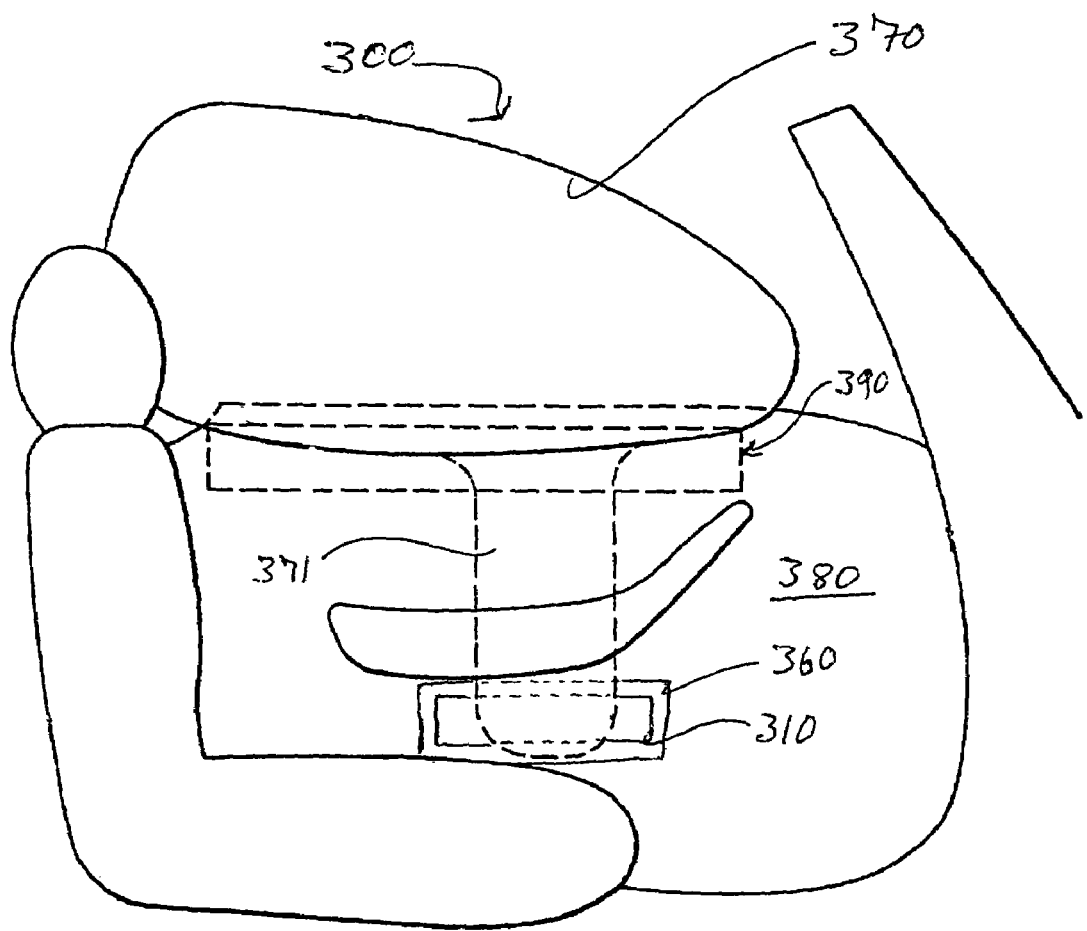
FIG. 5 is a partial view of a vehicle occupant protection system in a motor vehicle.

Turning to FIG. 3, there is shown a schematic view of a portion of a vehicle occupant protection system 100. System 100 includes a module 160 that houses an inflator 110, for example an inflator similar to those described herein. A wide variety of inflator modules are known in the art. An exemplary, but not limiting module suitable for use in a side impact system in accordance with the present invention is known from U.S. Pat. No. 6,398,294, hereby incorporated by reference. System 100 further includes an inflatable restraint device 170 that is stored in a folded position within or proximate to module 160. Module 160 and its contents may be located, for example, in a vehicle seat, the side door of a vehicle, or elsewhere. Upon activation of the occupant protection system, inflator 110 is activated to discharge an inflation gas into airbag 170, inflating the same and protecting the vehicle occupant. Referring also to FIG. 5, there is shown a similar occupant protection system 300 wherein a module 360, inflator 310 and airbag 370 are mounted in a vehicle side door 380. When it is desirable to activate the occupant protection system an appropriate signal is sent to inflator 310, which subsequently discharges inflation gas into airbag 370, for example via a throat 371. As airbag 370 inflates, it is preferably ejected from an interior of door 380 through a deployment opening 390. In a preferred embodiment airbag 370 displaces or bursts through trim on door 390, allowing airbag 370 to position itself between a vehicle occupant and the door and window of the vehicle.

Figure 4:
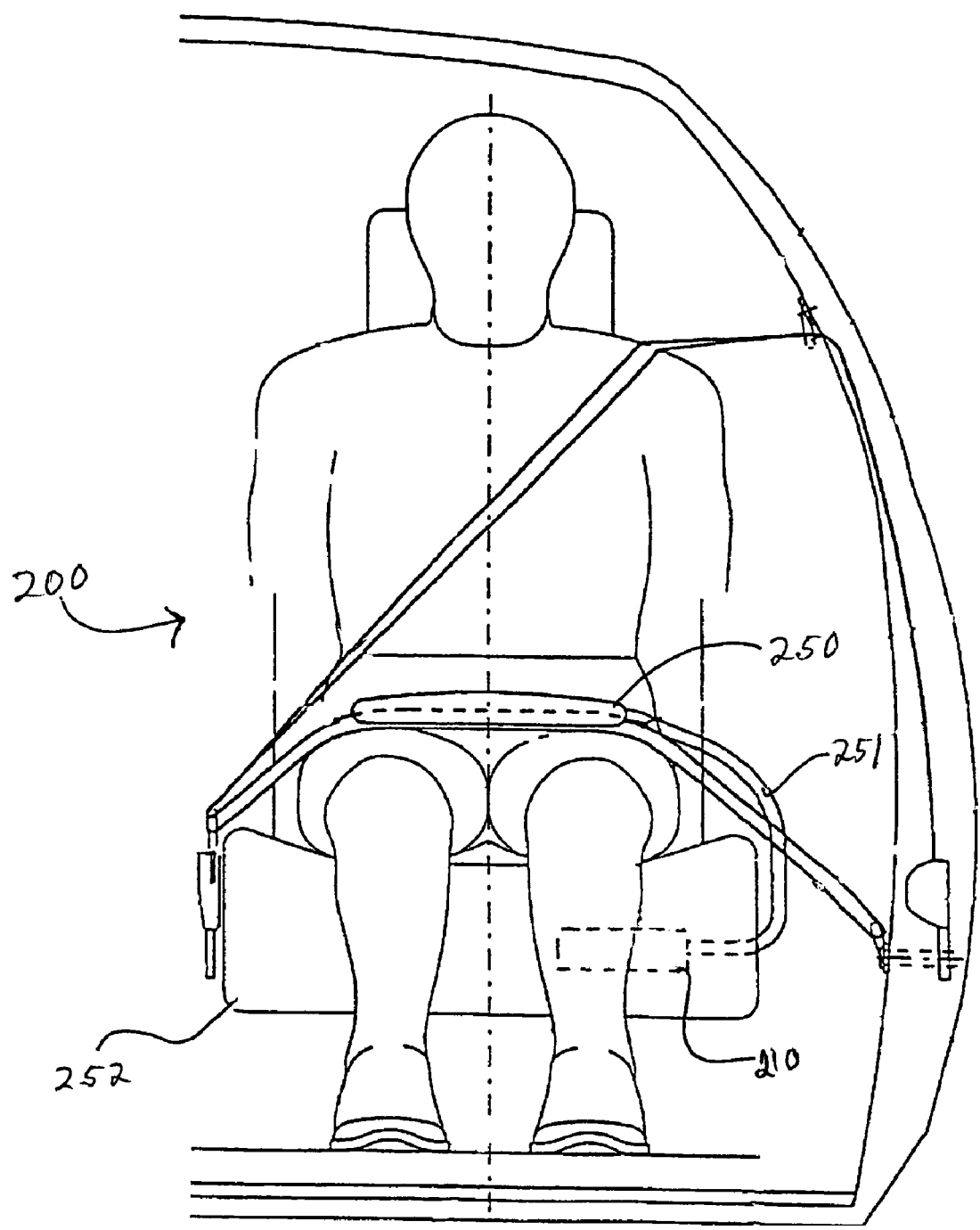
FIG. 4 is a partial view of a vehicle occupant protection system in a motor vehicle.

Referring to FIG. 4, there is shown another exemplary occupant protection system 200 wherein an inflatable airbelt 250 is utilized to assist in protecting the vehicle occupant in the event of a crash or sudden deceleration. In the embodiment pictured in FIG. 4, an inflator 210, for example similar to the inflators described herein, supplies an inflation gas to airbelt 250 via a gas supply line 251. Inflator 210 may be mounted, for example, in the vehicle seat 252, or it may be mounted at various other locations in the vehicle.

The present description is intended for illustrative purposes only, and should not be construed to limit the breadth of the present invention in any way. Thus, those skilled in the art will appreciate that various modifications, additions, and alterations to the presently disclosed embodiments might be made without departing from the intended spirit and scope of the present invention. Other aspects, features and advantages of the present invention will be apparent upon an examination of the attached drawing Figures and appended claims.

The invention claimed is:

1. An inflator comprising:
an inflator body;
a substantially cylindrical booster cup extending in said body, said booster cup having an outer peripheral wall and an end surface extending radially inwardly from said wall;
a plurality of apertures formed in said outer peripheral wall;
a first propellant charge positioned in said booster cup;
a second propellant charge positioned in said inflator body;
an initiator assembly operable to activate said first propellant charge, wherein a combustion thereof initiates a combustion of said second propellant charge and ejection of an inflation gas from said inflator body;
a filter abutting said booster cup end surface;
a perforated disc abutting said filters,
the filter comprising a wire mesh material extending continuously from the booster cup end surface to the perforated disc; and
a nozzle positioned at an end of said inflator and abutting said perforated disc for supplying an inflation gas.

2. The inflator of claim 1 wherein said inflator body comprises an inner peripheral wall separated from said outer peripheral wall by a substantially annular space; and
said second propellant charge is positioned in said space.

3. The inflator of claim 2 wherein said second propellant charge is positioned substantially adjacent said outer peripheral wall.

4. The inflator of claim 3 wherein said second propellant charge comprises a plurality of propellant tablets.

5. The inflator of claim 3 wherein said second propellant charge substantially fills the space between the outer peripheral wall and the inner peripheral wall of the inflator body.

6. The inflator of claim 5 wherein said filter constrains said second propellant charge in said space.

7. An inflator for an inflatable restraint system in a vehicle comprising:
an inflator body having first and second ends and an inner peripheral wall;
a booster cup extending in said body and having an outer peripheral wall and an end surface extending inwardly from said outer peripheral wall, said booster cup having a first propellant charge positioned therein;
said inner peripheral wall and said outer peripheral wall are separated by a substantially annular space having a second propellant charge positioned therein;
an initiator assembly disposed proximate said first end and operable to ignite said first propellant charge;
a filter abutting said booster cup end surface;
a perforated disc abutting said filter;
the filter comprising a wire mesh material extending continuously from the booster cup end surface to the perforated disc; and
a nozzle positioned at said second end of said body and abutting said perforated disc, said nozzle defining a nozzle outlet for supplying an inflation gas to the inflatable restraint system.

8. The inflator of claim 7 wherein said body has a total length and an area defined by a cross-section thereof, and said filter has a given length about one-fourth to one-half of the total length of the body, said filter occupying a volume determined by multiplying the cross-section of said body by the length of said filter.

9. The inflator of claim 7 wherein said booster cup is a substantially cylindrical elongate member substantially coaxial with said inflator body.

10. The inflator of claim 9 wherein said booster cup includes a plurality of apertures formed in said outer peripheral wall.

11. The inflator of claim 10 wherein said substantially annular space extends longitudinally in said inflator body from a point proximate said first end up to a point substantially coplanar with said end surface.

12. The inflator of claim 7 wherein said filter is substantially cylindrical and includes a substantially cylindrical periphery positioned adjacent said inner peripheral wall, and a substantially planar end positioned flush with said end surface.

13. An inflatable restraint system for a motor vehicle comprising:
an inflatable restraint device;
an inflator operable to provide an inflation gas to said inflatable restraint device, said inflator comprising an elongate substantially cylindrical inflator body having first and second ends and an inner peripheral wall;
an elongate booster cup mounted to said inflator body proximate said first end and extending substantially coaxially therewith, said booster cup having an outer peripheral wall separated from said inner peripheral wall by an annular space, and a plurality of apertures formed in said outer peripheral wall;
a propellant charge positioned in said space;
a filter positioned in said inflator body abutting an end portion of the booster cup, said filter securing said propellant charge in said space;
a perforated disc abutting said filter;
the filter comprising a wire mesh material extending continuously from the booster cup end surface to the perforated disc; and a nozzle member proximate said second end of said inflator body and abutting said perforated disc, said nozzle member constraining said filter against axial displacement.

14. The inflatable restraint system of claim 13 wherein said propellant charge comprises a plurality of gas generant tablets positioned in a geometrically ordered fashion in said annular space.

15. The inflatable restraint system of claim 14 wherein said propellant charge comprises a plurality of gas generant tablets stacked adjacently in said annular space and having cylindrical axes oriented substantially perpendicular said inner peripheral wall.

16. The inflatable restraint system of claim 13 wherein said nozzle is threadedly engaged with said inflator body.

17. The inflatable restraint system of claim 13 wherein said filter is secured against said booster cup, thereby constraining said propellant charge from movement in said annular space.

18. The inflatable restraint system of claim 13 further comprising a propellant charge positioned in said booster cup.

19. The inflatable restraint system of claim 13 further comprising an initiator body within said inflator body proximate said first end;
wherein said booster cup is attached to said initiator body and suspended therefrom, said booster cup supported in said inflator body solely by said attachment with said initiator body.

20. The inflatable restraint system of claim 13 wherein the inflatable restraint device is an airbag.

21. The inflatable restraint system of claim 13 wherein the inflatable restraint device is an airbelt.

22. An inflatable airbelt system for a motor vehicle comprising:
an inflatable airbelt;
an inflator operable to provide an inflation gas to said airbelt, said inflator comprising an inflator body and a booster cup extending in said body, said booster cup having an outer peripheral wall and an end surface extending radially inwardly from said wall;
said booster cup includes a plurality of apertures formed in said outer peripheral wall;
a first propellant charge positioned in said booster cup;
a second propellant charge positioned in said inflator body;
an initiator assembly operable to activate said first propellant charge, wherein a combustion thereof initiates a combustion of said second propellant charge via said apertures;
a filter abutting said booster cup end surface;
a perforated disc abutting said filter;
the filter comprising a wire mesh material extending continuously from the booster cup end surface to the perforated disc; and
a nozzle positioned at an end of said inflator and abutting said perforated disc for supplying an inflation gas to the inflatable restraint system.

23. The airbelt system of claim 22 wherein said booster cap is an elongate substantially cylindrical member oriented substantially coaxially with said inflator body.

24. The airbelt system of claim 23 wherein said inflator body includes an inner peripheral wall spaced from said outer peripheral wall of said booster cup by an annular space;
said second propellant charge positioned in said space.

25. The airbelt system of claim 24 filter constrains said second propellant charge in said space.

26. An inflator module for a vehicle occupant protection system comprising:
a module housing;
an inflator positioned in said housing, said inflator comprising a booster cup mounted within said inflator and extending substantially coaxially therewith, said booster cup having an outer peripheral wall partially defining an annular space and a plurality of apertures formed in said outer peripheral wall;
a propellant charge positioned in said space;
a filter positioned in said inflator abutting an end portion of said booster cup for securing said propellant charge in said space;
a perforated disc abutting said filter;
the filter comprising a wire mesh material extending continuously from the booster cup end surface to the perforated disc; and
a nozzle positioned at an end of said inflator and abutting said perforated disc for supplying an inflation gas.

27. The inflator module of claim 26 wherein said inflator comprises an inflator body having an inner peripheral wall opposing said outer peripheral wall, said inner and outer peripheral walls defining said space.

28. The inflator module of claim 27 wherein said filter constrains said propellant charge in said space.

29. A method of manufacturing a gas generator comprising the steps of:
positioning a booster cup within an elongate substantially cylindrical inflator body;
placing a propellant charge in a space extending between an outer peripheral wall of the booster cup and an inner peripheral wall of the inflator body;
inserting a filter member comprising a wire mesh material into the inflator body up to a point at which the filter bears against an end surface of the booster cup;
positioning a perforated disc abutting said filter member such that the wire mesh material extends continuously from the booster cup end surface to the perforated disc; and
positioning a nozzle member in the inflator body at a selected axial position and abutting said perforated disc such that the filter is constrained from axial movement between the nozzle member and the booster cup, whereby the filter secures the propellant charge in the space.

30. The method of claim 29 wherein the step of placing a propellant charge in the space comprises placing propellant tablets therein.

31. The method of claim 30 wherein the step of placing the propellant charge in the space comprises placing the propellant tablets therein in a geometrically ordered fashion up to a point substantially coplanar with an end surface of the booster cup.

32. The method of claim 29 wherein the filter length is sized to reduce or increase a gas pressure resulting from activation of the gas generator.

33. A gas generator manufactured according to the method of claim 29.

* * * * *

UNITED STATES PATENT AND TRADEMARK OFFICE
CERTIFICATE OF CORRECTION

| | | |
|---|---|---|
| PATENT NO. | : 7,506,891 B2 | Page 1 of 1 |
| APPLICATION NO. | : 10/826437 | |
| DATED | : March 24, 2009 | |
| INVENTOR(S) | : Quioc et al. | |

It is certified that error appears in the above-identified patent and that said Letters Patent is hereby corrected as shown below:

Column 7; Claim 23; Line 56; delete "cap" and insert --cup--

Signed and Sealed this

Second Day of June, 2009

JOHN DOLL
*Acting Director of the United States Patent and Trademark Office*